US012730547B2

(12) United States Patent
Cunha et al.

(10) Patent No.: US 12,730,547 B2
(45) Date of Patent: Sep. 8, 2026

(54) CONTENT CLAIMING

(71) Applicant: Wells Fargo Bank, N.A., San Francisco, CA (US)

(72) Inventors: Pedro Cunha, Springfield, NJ (US); Srilalitha Kasibhotla, San Antonio, TX (US); James J. Keck, Jersey City, NJ (US); Eric Kunz, Boston, MA (US); Mohana Rao Mulli, Allen, TX (US); Geoffrey Kyle Root, Charlotte, CT (US); Kurt Schmitt, Farmington, CT (US); Mark Albert Simoes, Lakewood Village, TX (US)

(73) Assignee: Wells Fargo Bank, N.A., San Francisco, CA (US)

( * ) Notice: Subject to any disclaimer, the term of this patent is extended or adjusted under 35 U.S.C. 154(b) by 239 days.

(21) Appl. No.: 18/741,467

(22) Filed: Jun. 12, 2024

(65) Prior Publication Data

US 2025/0383754 A1 Dec. 18, 2025

(51) Int. Cl.
*G06F 3/0482* (2013.01)
*G06F 3/0484* (2022.01)

(52) U.S. Cl.
CPC .......... *G06F 3/0482* (2013.01); *G06F 3/0484* (2013.01)

(58) Field of Classification Search
CPC .................................................... G06F 3/0482
USPC .......................................................... 715/810
See application file for complete search history.

(56) References Cited

U.S. PATENT DOCUMENTS

| | | | | |
|---|---|---|---|---|
| 6,856,977 | B1 * | 2/2005 | Adelsbach | G06Q 30/06 713/176 |
| 2004/0049463 | A1 * | 3/2004 | Kwon | G07F 7/1008 705/50 |
| 2012/0259720 | A1 * | 10/2012 | Nuzzi | G06Q 30/0609 705/26.1 |
| 2016/0239273 | A1 * | 8/2016 | Bhogal | G06F 8/36 |
| 2017/0357388 | A1 * | 12/2017 | Yanagihara | G06F 16/1737 |
| 2018/0068274 | A1 * | 3/2018 | Buffington | G06Q 40/06 |
| 2019/0163883 | A1 * | 5/2019 | Savanah | G06F 21/121 |
| 2021/0019766 | A1 * | 1/2021 | Shakedd | G08B 13/2448 |
| 2022/0134235 | A1 * | 5/2022 | Patana | A63F 13/79 463/29 |
| 2022/0188746 | A1 * | 6/2022 | Tennent | G06Q 10/087 |
| 2023/0147221 | A1 * | 5/2023 | Fileccia | G06K 19/06037 340/572.1 |

(Continued)

*Primary Examiner* — Reza Nabi

(74) *Attorney, Agent, or Firm* — Merchant & Gould P.C.

(57) ABSTRACT

As the number of applications developed by the organization increases, the computing resource costs for storing and maintaining applications may also increase significantly. The disclosed content claiming system provides a solution to reducing computing resources necessary to maintain and store content that is no longer needed by allowing users to claim ownership over content and confirm whether the content is still in use. For example, in the disclosed content claiming system, a user initiates the process of content claiming by accessing a user interface associated with a content claiming application, wherein the user interface displays a listing of content currently maintained by the organization. The user may then select unclaimed content objects based one or more preferences and provide attestations regarding ownership and usage. Content claiming helps organization make informed decisions regarding continued storage and maintenance of content.

20 Claims, 8 Drawing Sheets

(56) References Cited

U.S. PATENT DOCUMENTS

| | | | | |
|---|---|---|---|---|
| 2023/0237471 | A1* | 7/2023 | Siedleczka | G06Q 20/389<br>705/75 |
| 2024/0104602 | A1* | 3/2024 | Bax | G06Q 30/0257 |
| 2024/0177145 | A1* | 5/2024 | Miele | G06Q 30/01 |
| 2024/0223371 | A1* | 7/2024 | Narayanan | G06Q 30/0601 |
| 2024/0412284 | A1* | 12/2024 | Higgins | G07F 17/3244 |
| 2024/0412593 | A1* | 12/2024 | Higgins | G06Q 50/34 |
| 2025/0190575 | A1* | 6/2025 | Kirat | G06F 21/577 |
| 2025/0383754 | A1* | 12/2025 | Cunha | G06F 3/0482 |

* cited by examiner

600

Claim as Needed

Individual App owner's – Claim your content against your respective App ID

Platform and SRE teams – Claim your content against your respective Support Groups

606

You have successfully claimed this record as needed for the app id/SRE Group : App id 1

CONTENT CLAIMING

BACKGROUND

Large organizations often include disparate departments or divisions that each develops applications that aid in performing tasks related to the objectives of the particular department or division. Over time, organizations may acquire a library of applications that may not always be in-use by the department or division. As the number of applications developed by the organization increases, the computing resource costs for storing and maintaining applications may also increase significantly.

SUMMARY

Embodiments of the disclosure are directed to content claiming.

In a first embodiment, an example method for content claiming is disclosed. The method comprises: displaying of one or more unclaimed content objects on a user interface of a user electronic computing device associated with a user; receiving a selection of at least one unclaimed content object of the one or more unclaimed content objects; receiving a first selection of a selected claiming option from a plurality of claiming options, wherein the plurality of claiming options is related to claiming ownership of the at least one unclaimed content object; based on the selected claiming option, displaying a request for attestation on the user interface; receiving the attestation from the user interface; updating content data associated with the at least one unclaimed content object based on the attestation to generate an updated content data associated with the at least one unclaimed content object; and storing the updated content data associated with the at least one unclaimed content object in a datastore.

In a second embodiment, an example system for content claim is disclosed. The system comprises: a processor; memory comprising instructions that when executed by the processor causes the processor to: display of one or more unclaimed content objects on a user interface of a user electronic computing device associated with a user; receive a selection of at least one unclaimed content object of the one or more unclaimed content objects; receive a first selection of a selected claiming option from a plurality of claiming options, wherein the plurality of claiming options is related to claiming ownership of the at least one unclaimed content object; based on the selected claiming option, display a request for attestation on the user interface; receive the attestation from the user interface; update content data associated with the at least one unclaimed content object based on the attestation to generate an updated content data associated with the at least one unclaimed content object; and store the updated content data associated with the at least one unclaimed content object in a datastore.

In a third embodiment, an example method for content claiming using content claiming application is disclosed. The method comprises: retrieving a plurality of content objects from a content source computing device; displaying a user interface associated with the content claiming application on a user electronic computing device, wherein the user interface includes: a listing of the plurality of content objects; receiving a first selection of at least one content object of the plurality of content objects; receiving a second selection to claim ownership over the at least one content object; displaying a request for attestation regarding ownership of the at least one content object; receiving attestation of ownership over the at least one content object; updating a claim status associated with the at least one content object to indicate that the at least one content object is claimed; and transferring storage of the at least one content object to a cloud storage device.

The details of one or more techniques are set forth in the accompanying drawings and the description below. Other features, objects, and advantages of these techniques will be apparent from the description, drawings, and claims.

BRIEF DESCRIPTION OF DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
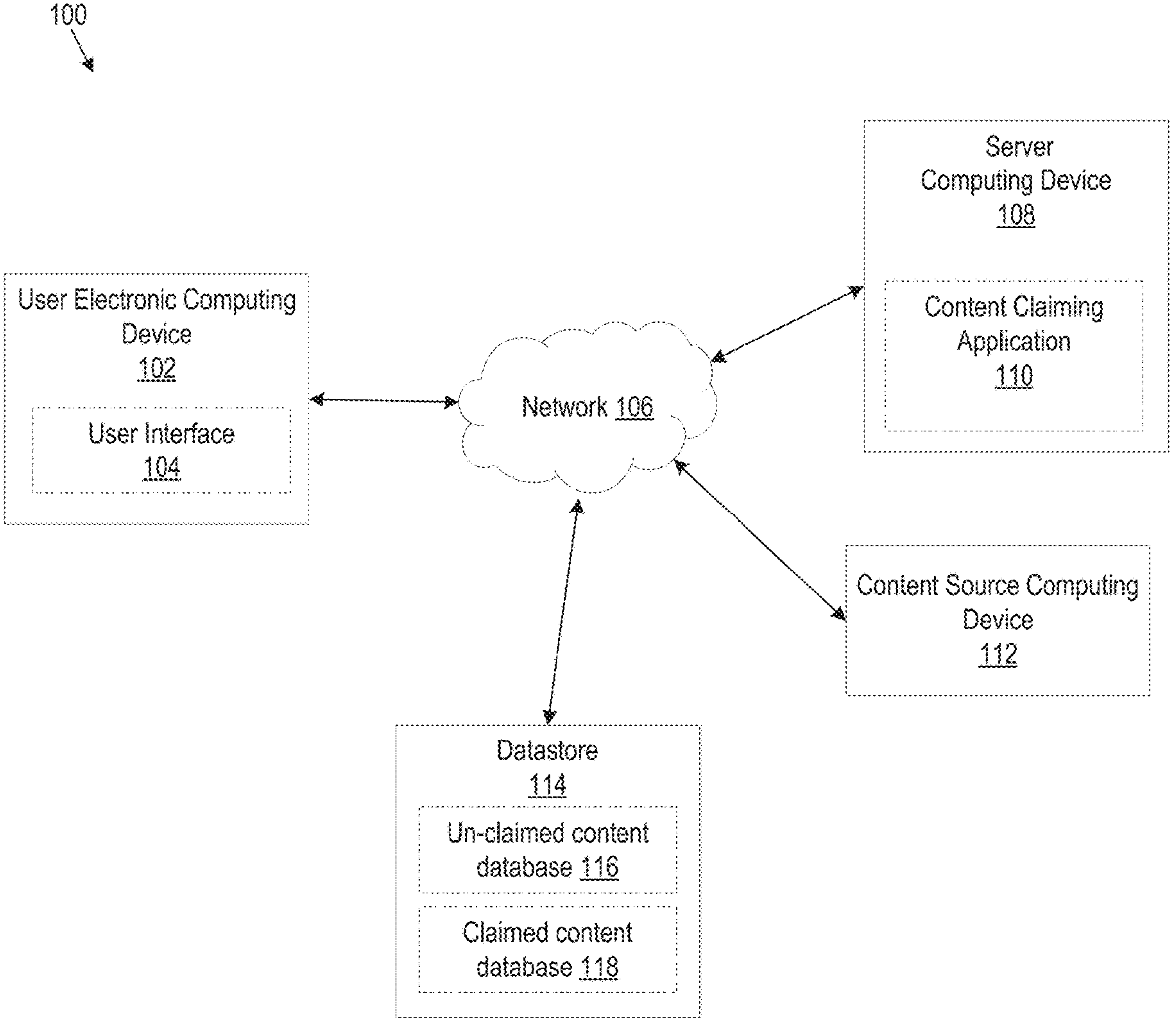
FIG. 1 illustrates an example content claiming system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, the subject matter of the present disclosure relates to a content claiming system that retrieves attestations against applications for un-claimed content. Organizations often maintain a library of applications, tools, searches, alerts and/or dashboards that facilitate the employees of the organization to complete their tasks and objectives. Over time, users of the application may find newer solutions or alternative applications and no longer have a use for an application. In some cases, only a minority of users may have a user for a particular application. Organizations often continue to host and/or maintain applications even when the application is no longer in widespread use.

In some cases, the organization may host content locally on-premise or on-prem. In other cases, the organization may host content on one or more cloud server devices. As computing resource costs for hosting content in a cloud computing environment is significant and organizations may only have limited computing resources to host content locally or within a cloud computing environment, organizations that are looking into migrating the hosting of the content from a local server computing device to the cloud computing environment or organizations looking to reduce hosting burdens locally or on a cloud computing environment may benefit from no longer hosting or maintaining content that are no longer being used or maintained by users within the organization. However, identifying the content that have limited benefits to the organizations depends on identifying the owners and end-users of the content. Often identifying the users that own or use particular content within the organization may be difficult.

In some examples, the disclosed content claiming application may be used to manage content stored within heterogeneous systems within an organization as part of a one-time migration to reduce computing costs associated with moving content that is no longer in use or needed. For example, the content may be migrated to a central storage solution locally or to an external storage solution such as a cloud computing device. In other examples, the disclosed content claiming application may also be used as an ongoing solution to insure that content, especially content that require significant computing resources and/or recurring costs to maintain, can be managed at optimal levels to ensure that stale content is pruned in a timely manner to limit computing resource expenditure.

In the disclosed content claiming system, a content claiming application generates and displays a user interface on a user electronic computing device. A user may interact with the user interface to provide appropriate inputs that are then processed by the content claiming application as part of the content claiming process. As part of the content claiming process, the content claiming application may receive an input with selected unclaimed content or content objects that are selected based on one or more user preferences. Content objects can include any content that is used by a user of the organization. For example, content objects can include, but are not limited to, dashboards, saved searches, and alerts. In some examples, the dashboards, saved searches and alerts may be contained and/or managed within an application or a tool. In other examples, content objects may include the entire application or tool. In response, the content claiming application may present the user with one or more claiming options. In response, the content claiming application may receive an input for a claiming option and relevant information related to the selected unclaimed content objects. The relevant information may include ownership and/or usage attestations from the user. The content claiming application may then securely transfer the submitted data to a datastore, where it is stored and processed for future use.

In some examples, upon receiving attestation that a particular content object is no longer in user or needed within the organization, the content object, if stored locally on-prem, may be removed from the database. Alternatively, if the content claiming application is executed in anticipation of content objects being moved to a cloud storage device, the content object that has received an attestation that it is no longer in use may not be transferred for storage within the cloud storage device to save costs.

The content claiming application may also generate reports that include metrics that provide insights into the content hosted by the organization. The metrics may include breakdowns of claimed vs. un-claimed content objects, costs for storing the claimed and unclaimed objects on-prem or transferring to a cloud computing device, statistics regarding timelines of creation and use related to the content object, user or teams within the organization that created and/or maintained the content object since creation, average number of users that have used the content object over specific timeframes, etc.

The disclosed content claiming system includes significant advancement in the field of content management and content ownership attestations. Content claiming empowers individuals to assert ownership rights over unclaimed objects, thereby protecting their work. The disclosed content claiming system offers a streamlined and user-friendly interface, seamless communication between modules and comprehensive database management capabilities.

The content claiming application provides a technical solution to a technical problem. Minimizing computing costs and resources needed to store and manage large amounts of content in datastores is a technical problem. The disclosed solution of using the content claiming application for each user or group taking ownership and providing input regarding usage via a user interface is technical in nature. In particular, the disclosed content claiming application includes a user interface with many technical features including an option to filter the content objects by certain parameters such that a user may quickly identify relevant content objects to provide additional input on.

In addition, the content claiming application also automatically generates reports that include insights into the current and future computing resources necessary to maintain each of the content objects, which assists the organization in making informed decisions. Further, removing unnecessary and unused content from being stored and maintained results in reducing processing time and space, which results in a practical application.

FIG. 1 illustrates an example configuration of a content claiming system 100. The content claiming system 100 includes a user electronic computing device 102, a network 106, a server computing device 108, content source computing device 112 and datastore 114. In some examples, the server computing device 108 may include a content claiming application 110.

The user electronic computing device 102 may include an electronic computing device of the user. In some examples, the electronic computing device can be a desktop computer, a laptop computer, virtual reality user device, a mobile electronic computing device such as a smartphone or a tablet computer. The electronic computing device permits the user to access the server computing device 108 over a network 106 via a user interface 104. In some examples, the user may be an individual that is an employee of the organization that maintains the content claiming application 110 on the server computing device 108. Although a single user electronic computing device 102 is shown, the content claiming system 100 allows hundreds, thousands, or more computing devices to connect to the server computing device 108.

The user interface 104 may displayed on a display screen of the user electronic computing device 102 and may display data generated by the content claiming application 110 for the user using the user electronic computing device 102. The user interface 104 may also receive inputs from the user related to one or more options included within the user interface 104 and send the received inputs to the content claiming application 110 on the server computing device 108 for further processing.

The network 106 may include a computer network, such as the Internet. The user on the user electronic computing device 102 can access the content claiming application 110 hosted on the server computing device 108 via the network 106.

The server computing device 108 may be a server computing device associated with the organization that develops, maintains and/or uses a plurality of applications, tools, searches, alerts, dashboards and other content to conduct or facilitate operations within the organization. Each distinct application, tool, search, alert, dashboard, etc. may be referred to as content objects herein. In an example, the server computing device 108 may include a server computing device that is owned and/or maintained by the organization itself. In other examples, the server computing device 108 may be owned and/or maintained by an external entity that is associated with the organization. The In some examples, the organization may include a financial organization such as a bank that provides one or more financial services to customers. In other examples, the organization may include another type of organization that provides other types of products or services to customers. Although a single server is shown, in reality, the server computing device 108 can be implemented with multiple computing devices, such as a server farm or through cloud computing. Many other configurations are possible.

In one example, the content claiming application 110 is configured to retrieve content object related data from a one or more source systems, determine whether the content object has been claimed or un-claimed by one or more users within the organization, generate a user interface that facilitates users to claim un-claimed content objects by providing attestations regarding ownership and use of the content object, and based on attestations by users, determine whether the organization should continue maintaining the content object within the organization's computing systems or within a cloud computing environment associated with the organization. The content objects associated with an organization may include applications, tools, searches, alerts, dashboards and any other content created, owned, acquired or maintained by one or more users affiliated with the organization. The implementation of the content claiming application 110 is described in further detail in relation FIGS. 2-7.

The content source computing device 112 may be a server computing device associated with the organization that hosts some or all content objects owned and/or maintained by the organization. In some examples, the content source computing device 112 and the server computing device 108 may be the same. In other examples, the server computing device 108 and the content source computing device 112 may be separate server computing devices that are both affiliated with the organization. Although a single content source computing device 112 is shown, in reality, the content source computing device 112 can be implemented with multiple computing devices, such as a server farm or through cloud computing. Many other configurations are possible.

The example datastore 114 may include one or more electronic databases that can store content data related to the one or more content objects maintained by the organization. For example, the datastore 114 may include an un-claimed content database 116 and a claimed content database 118. The content data related to the one or more content objects include identification data associated with the content objects, such as a title, content type, visibility of the content among internal and external users, current claim status of the content objects, use and/or maintenance status of content objects, attestation details regarding ownership/use such as a user identifier or a group identifier for a user or a group that has claimed the content object. The datastore 114 may store content objects and associated content data with a claim status of "un-claimed" in the un-claimed content database 116 and may store content objects and associated content data with a claim status of claimed" in the claimed content database 118. Other ways of organizing the content objects and content data within the one or more databases of the datastore 114 is also possible.

The datastore 114 may be maintained by the same organization that maintains the server computing device 108 or one or more external enterprises associated with the organization that maintains the server computing device 108. The datastore 114 can be accessed by server computing device 108 to retrieve relevant data associated with the application and the content claiming application 110.

Figure 2:
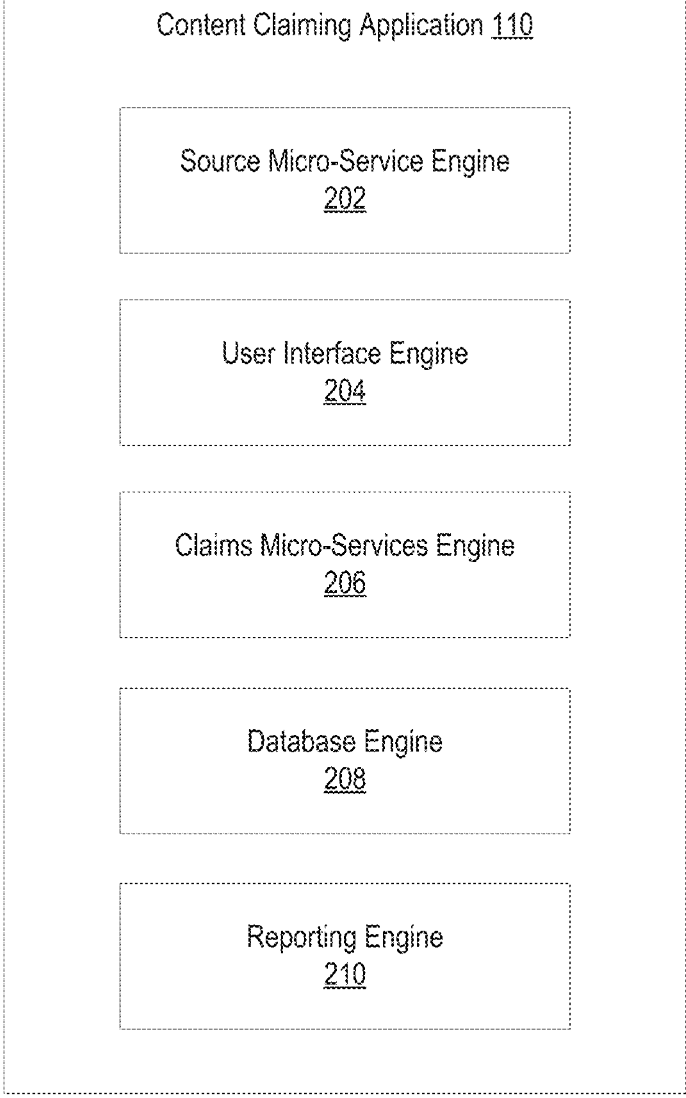
FIG. 2 illustrates an example content claiming application of a server computing device in the system of FIG. 1.

FIG. 2 illustrates an example configuration of the content claiming application 110 of FIG. 1. In some examples, the example content claiming application 110 may be configured to include a source micro-services engine 202, a user interface engine 204, a claims micro-services engine 206, a database engine 208 and a reporting engine 210.

The source micro-services engine 202 may be configured to include one or more micro-services that retrieve content data from the content source computing device 112. For example, the content source computing device 112 may store content objects associated with the organization, including applications, tools, searches, alerts, dashboards, etc. For each content object stored by the content source computing device 112, the content source computing device 112 may also store related content data associated with the content object. In some cases, the content data may be stored as metadata associated with the content object.

For example, content data for a content object may include several parameters, including title of the content object, a content type associated with the content object, visibility of the content object among internal and external users, current claim status of the content object, and a user identifier or a group identifier for a user or a group that has claimed the content object. Other types of content data may also be stored. In some cases, the content data of a content object may include values for all content data parameters. In other cases, one or more of the parameters may be missing from the content data.

The source micro-services engine 202 may send a request to the content source computing device 112 for content data associated with content objects stored in the content source computing device 112. Upon retrieving the content data associated with the content objects, the source micro-services engine 202 may analyze the content data to determine whether the content object is claimed or un-claimed. The source micro-services engine 202 may add the determined claim status information to the content data associated with the content object.

For example, in some cases, when the ownership and/or usage information for a content object is unknown or incomplete, the content object may be considered by be un-claimed and the claim status associated with the claim object may be set to or updated to: "un-claimed". In other cases, the ownership and usage information may be known and recorded in the form of an attestation or verification record or certificate. In such cases, the claim status of the content object may be set to or updated to: "claimed."

After updating the content date associated with the content object, the content data and the associated content object may be stored within the datastore 114 for use by one or more of the other engines of the content claiming application 110. For example, the source micro-services engine 202 may interface with the database engine 208 and request the database engine 208 to manage the storing of the content object and the content data within the datastore 114. In some examples, the source micro-services engine 202 may interface with the database engine 208 to store the content objects with a claim status of "claimed" in a claimed content database 118 within the datastore 114 and store the content objects with a claim status of "un-claimed" in an un-claimed content database 116 within the datastore 114.

The user interface engine 204 is configured to generate a user interface 104 that is displayed on a display screen of the user electronic computing device 102. The user interface 104 is an interactive platform for users to navigate through a comprehensive list of content objects. In some examples, the user interface 104 may only present a list of un-claimed content objects. In other examples, the user interface may present both claimed and un-claimed content objects.

The user interface engine 204 may interface with the datastore 114 to retrieve the content objects and associated content data stored in the datastore 114 and generate a list of content objects for display within the user interface 104. Upon the user selecting to view un-claimed content objects, the user interface engine 204 may interface with the database engine 208 to retrieve the content data for un-claimed content objects from the datastore 114 and display the list of un-claimed content data on the user interface 104. If a user prefers to view both claimed and un-claimed data objects, the user interface engine 204 may interface with the database engine 208 to retrieve the content data for both claimed and un-claimed content objects from the datastore 114.

The user interface engine 204 may offer filtering features that allow users to refine the list of content objects based on specific criteria. For example, upon launching the user interface 104 on the user electronic computing device 102, users may be presented with a visually organized display showcasing all available content objects. The user interface 104 may include filtering features that allow the user to filter the available content objects based on various parameters including user identifier, type of object, title and claim status. Other parameters for filtering the content objects are also possible.

The user interface 104 generated by the user interface engine 204 may include predefined filters that the user may select to narrow down the list of content objects. In addition to predefined filters, the user interface 104 may also include individual filter parameters that the user may select to customize their search preferences. By offering flexible filter options, the content claiming application 110 enhances user experience by providing tailored search results that align with the user's preferences and objectives.

In addition to providing filtering options to filter content objects based on one or more customized or predefined filter criteria, the user interface 104 also provide an option for the user to simply browse through the content objects by displaying all content objects as a list. The user interface 104 allows the user to select a single content object or multiple content objects for further processing. For example, upon selecting one or more content objects, the user may be presented with an option to request further information related to the selected content object(s), or option to modify one or more parameters of the content data associated with the selected content object(s).

In cases where the selected content objects are un-claimed content objects, upon selection of one or more content objects, the user interface may present an option for the user to submit relevant attestations associated with the selected content object(s). In some examples, attestations associated with a selected content object includes attesting ownership over the selected content object and/or attesting that the content object continues to provide value to the organization and therefore there is a need for organization to continue to maintain the content object. Attesting ownership or attesting the need for the organization to continue to maintain the content object is done by selecting one or more options on the user interface 104.

For example, when a user selects one or more un-claimed content objects on the user interface 104, the user interface engine 204 may present the user with an option to submit attestations related to the selected content object(s) on the user interface. Upon the user affirmatively selecting that the user will continue with the attestation process, the user interface 104 may present the user with options to (1) claim the content object as needed; (2) claim the content object as not needed; and (3) un-claim the content object. The user interface engine 204 may interface with the claims micro-services engine 206 to manage the user selection of one or more of these options and is described in greater detail below. The details of the of the user interface and the display of options requesting attestations from the user via the user interface are descried in further detail with respect to FIGS. 4-7.

The claims micro-services engine 206 includes one or more micro-services that are configured to receive user input regarding attestations and handles the submission process by updating the appropriate content data associated with one or more content objects. In addition, the claims micro-services engine 206 may also interfaces with the database engine 208 to manage the transfer of the content data for storage. The one or more micro-services of the claims micro-services engine 206 may efficiently collect and organize user-submitted data, ensuring its accuracy and completeness and optimizing the attestation process.

As described above in relation to the user interface engine 204, the user interface engine 204 may present the user with options to (1) claim the content object as needed; (2) claim the content object as not needed; and (3) un-claim the content object on the user interface. The first option to "claim the object as needed" allows a user, individually or on behalf of a group/team, claim ownership over the selected content object and claim that the selected content object is needed and still in use by the user or the group/team and should continue to be stored and maintained. The second option to "claim the content object as not needed" allows a user, individually or on behalf of a group/team, to claim ownership over the selected content object while confirming that the selected claim object is no longer in user or in need. Therefore, the selected content object may not need to be stored or maintained by the organization. The third option to "un-claim the content object" allows a user, individually or on behalf of a group/team, disclaim a previously claimed content object. For example, when a user or group is no longer affiliated with a particular content object or when a user accidentally claimed a content object, the user may use the third option to un-claim the previously claimed content object.

Upon receiving a selection of the option to "claim the content object as needed", the claims micro-services engine 206 may interface with the user interface engine 204 to cause the user interface 104 to display an attestation display, which may be a pop-up screen, requesting the user to confirm the claiming of the content object. As part of the confirmation process, the claims micro-services engine 206 may interface with the user interface engine 204 to request that the user claim the content object by providing user's application identifier or support group identifier. The application identifier or support group identifier may be a text, numerical or alphanumerical identifier that is associated with the particular user or group/team within the organization respectively. By entering the application identifier or support group identifier, the user attests that the user themselves or the group/team that the user is associated with takes ownership of the content object and confirms the need to continue to store and manage the content object.

Upon receiving the application identifier or support group identifier, the claims micro-services engine 206 verifies whether the user or users associate with the particular application identifier or support group identifier have the authority to make the attestation. Upon verifying that the user or users associate with the particular application identifier or support group identifier have the authority to make the claim, the claims micro-services engine 206 collects the user input, including the user identifier, the received application identifier and/or support group identifier, and interfaces with the database engine 208 to update the content data associated with the content object with the collected user input. In addition, the claims micro-services engine 206 may also update the claim status associated with the content object to indicate that the content object is now claimed and the use/maintenance status of the claim object to indicate that the content object is or will be needed.

Upon receiving a selection of the option to "claim the content object as needed", the claims micro-services engine 206 may interface with the user interface engine 204 to cause the user interface 104 to display an attestation display requesting the user to confirm the claiming of the content object and confirm that content object is no longer in use or needed. The micro-services engine 206 may interface with the user interface engine 204 to complete a confirmation process, similar to the process described above. The user may be prompted to provide an application identifier or a support group identifier to confirm claim over the content object. In addition, the user may also be prompted to confirm that the content object is no longer in use or needed. Upon receiving the user input, the claims micro-services engine 206 may interface with the database engine 208 to update the content data associated with the content object with the received user input. In addition, the claims micro-services engine 206 may also update the claim status associated with the content object to indicate that the content object is now claimed and the use/maintenance status of the claim object to indicate that the content object is not in use and will not be needed.

Upon receiving a selection of the option to "un-claim the content object", the claims micro-services engine 206 may interface with the user interface engine 204 to cause the user interface 104 to display an attestation display requesting the user to confirm the un-claiming of the content object. For example, the user, individually or on behalf of a group/team, may be listed on the content data as the owner of the content object. The user may have previously purposely or accidentally claimed the content object. However, circumstances may have since changed and the user or the group/team that the user is associated with may no longer own the content object. In such a case, the user may use the "un-claim the content object" option to un-claim ownership over the content object.

The micro-services engine 206 may interface with the user interface engine 204 to complete a confirmation process, similar to the process described above. The user may be prompted to provide an application identifier or a support group identifier to confirm that the user or the group/team no longer holds ownership over the content object. Upon receiving the user input un-claiming ownership over the content data, the claims micro-services engine 206 may interface with the database engine 208 to update the content data associated with the content object with the received user input. In addition, the claims micro-services engine 206 may also update the claim status associated with the content object to indicate that the content object is un-claimed.

The database engine 208 is configured to manage storage of content objects and associated content data in the datastore 114. For example, the database engine 208 is also configured to interface with the source micro-services engine 202 and the claims micro-services engine 206 to store and retrieve content objects and associated content data.

As the source micro-services engine 202 retrieves content objects and associated content data from the content source computing device 112, the services micro-services engine 202 may interface with the database engine 208 to identify content objects with the claim status of "claimed" and "un-claimed" and store them within appropriate databases within the datastore 114. In addition, as the claims micro-services engine 206 receives a request from the user interface engine 204 to retrieve claimed content objects, un-claimed content objects or a combination of both, the claims micro-services engine 206 may interface with the database engine 208 to retrieve content objects and associated content data that match the request from the one or more databases within the datastore 114. In addition, the claims micro-services engine 206 may send user input, including attestations, received from the user interface to the database engine 208 for the database engine to update the corresponding content data based on received user input and attestations.

In some examples, the content objects and associated content data are stored in one or more databases within the datastore 114 based on claim status. For example, the database engine 208 may store content objects and associated content data that have a claim status of "un-claimed" in an un-claimed content database 116 within the datastore 114 and store content objects and associated content data that have a claim status of "claimed" in a claimed content database 118 within the datastore 114. As the claim status associated with a content object changes from un-claimed to claimed, the database engine 208 may automatically retrieve the content object and associated content data from the un-claimed content database 116 within the datastore 114 and store it in the claimed content database 118 within the datastore 114. Similarly, when the claim status associated with a content object changes from claimed to un-claimed, the database engine 208 may automatically retrieve the content object and associated content data from the claimed content database 118 within the datastore 114 and store it in the un-claimed content database 116 within the datastore 114.

The reporting engine 210 is configured to analyze the content objects and associated content data and provide insightful statistics and analytics. For example, the reporting engine 210 may interface with the database engine 208 to retrieve content object and associated content data to generate various reports highlighting key metrics. The key metrics could include, but are not limited to: including total number of content objects, the percentage of content objects that are claimed, the percentage of content objects that remain un-claimed, a timeline of when the content objects were created, a breakdown of users or groups that own the claimed content objects, percentage of content objects are attested as being needed, the space needed to store the claimed content objects, breakdown of claimed and/or un-claimed content objects by creator, application type, title, etc. and one or more comparative data comparing the content objects claimed and un-claimed by a user and or group.

The reporting engine 210 may interface with the user interface engine 204 to provide a user interface where the user may select one or more options to customize the information included within the generated reports and customize the look and placement of the information within the reports. The reporting engine 210 may also interface with the database engine 208 to store the user's parameters and preferences regarding the reports and the generated reports in the datastore 114.

In some examples where the content claiming application 110 is used to determine whether the organization should continue storage and management of content objects, the content objects with content data indicating that the content object is no longer in use and is not needed may be deleted from the datastore 114 and may no longer be stored or maintained. In other examples, where the content claiming application 110 is used to determine whether the organization should transfer storage of the content objects to a cloud storage device, the content objects with content data indicating that content object are in use and in need may be transferred to be stored in the cloud storage device while the content objects with content data indicating that the content objects are no longer in use and not in need may be continued to be stored and maintained on-prem or deleted from being stored in the datastore 114.

Figure 3:
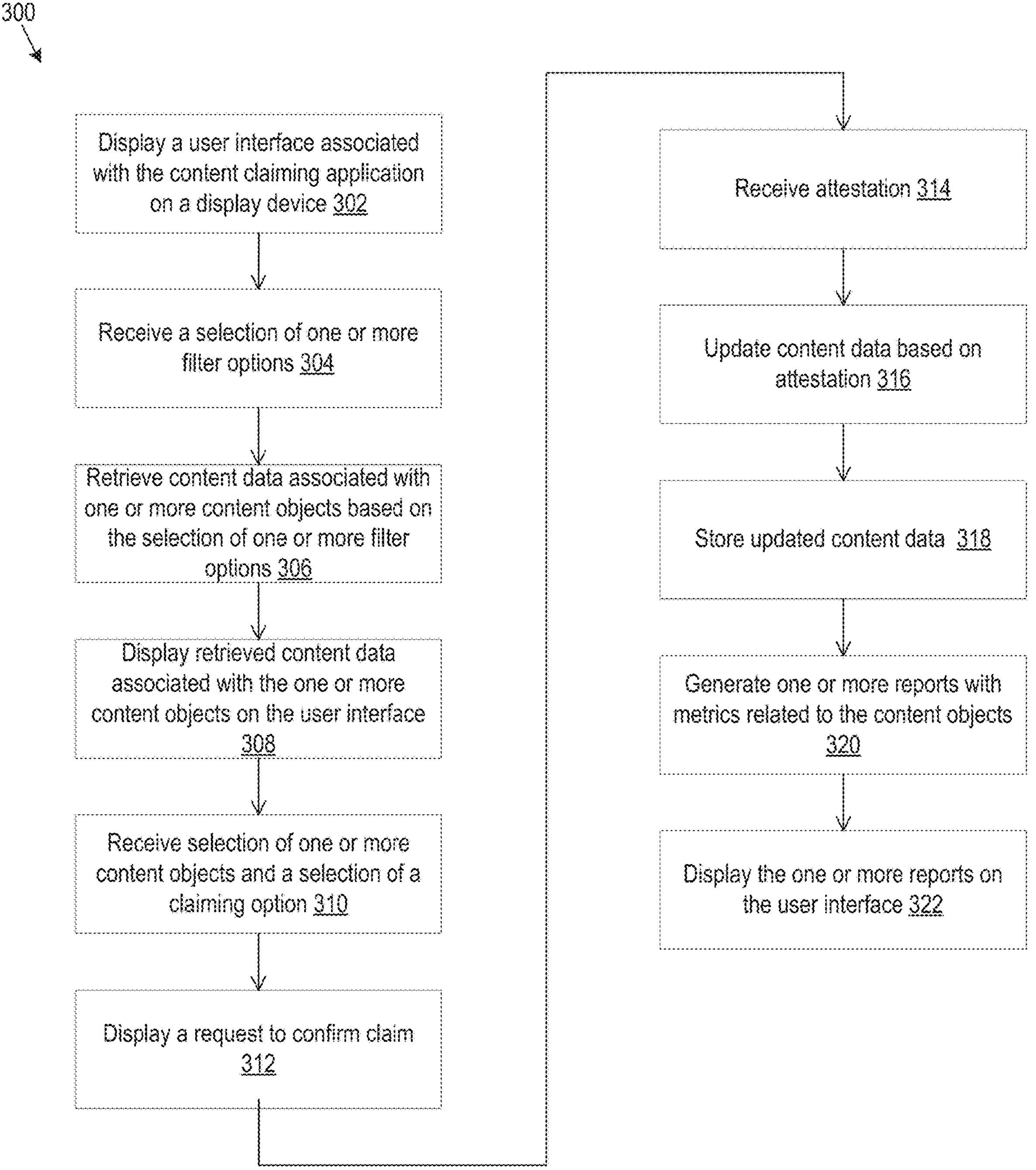
FIG. 3 illustrates an example method executed by the content claiming application of FIG. 2 for managing content within an organization.

FIG. 3 illustrates an example method 300 executed by the content claiming application 110 of FIG. 2 for managing content within an organization. The example method 300 is configured to executed operations 302-320.

In operation 302, the user interface engine 204 of the content claiming application 110 may cause the display of the user interface 104 associated with the content claiming application 110 on the user electronic computing device 102. The user interface engine 204 may interface with the database engine 208 to retrieve data associated with the user interface display from the datastore 114 and based on the retrieved data, cause the display of the user interface 104 on the user electronic computing device 102. The user interface may include a visually organized display showcasing all available content objects and one or more filter criteria.

In operation 304, the user interface engine 204 may receive a selection of one or more filter options associated with the one or more filter criteria from the user interface 104. The user interface 104 generated by the user interface engine 204 may include predefined filters that the user may select to narrow down the list of content objects. For example, a predefined filter may include filtering based on a combination of object type and creation date, such as content objects that are dashboards and were created after 2020. In addition to the predefined filters, the user interface 104 may also include individual filter criteria that the user may select to customize their search preferences. For example, the filter criteria may include parameters such as user identifier, type of object, title, claim status, date and/or time of creation, date and/or time of last use, etc. Other types of filter parameters are also possible.

In operation 306, upon receiving a selection of one or more filter options, the user interface engine 204 may interface with the claims micro-services engine 206, which in turn interfaces with the database engine 208 to retrieve content data associated with one or more content objects that correspond to selection of the one or more filter options. For example, if the selection from operation 304 includes filtering all available content objects based on object type to only include content objects that are dashboards, then in operation 306, the user interface engine 204 interfaces with the claims micro-services engine 206, which in turn interfaces with the database engine 208 to retrieve content data that only corresponds to content objects that are dashboards.

In operation 308, the user interface engine 204 displays content data associated with the retrieved content objects from operation 306. For example, the claims micro-services engine 206 may interface with the user interface engine 204 to provide the content data associated with the filtered content objects. The user interface engine 204 may then cause the display of the content data on the user interface 104 of the user electronic computing device 102. The content data associated with a content object may include title of the content object; object type; visibility of the content objects, including whether the content object is private or public and who can have access to view the content object; the claim status of the content object, including whether the object is claimed or un-claimed; the usage status of the content object, including whether the object is in use or will be in use and/or whether the content object is or will be needed by at least one or more users within the organization; the claim application identifier or support group identifier, which is an identifier associated with a user or group within the organization that has claimed ownership over the content object; and claim users, which includes a user identifier for the user that claimed ownership over the content object.

In operation 310, the user interface engine 204 may receive a selection of one or more content data associated with one or more content objects that were displayed on the user interface 104 in operation 308. In addition, the user interface engine 204 may also receive a selection of a claiming option via the user interface 104. For example, each content data associated with the content object that was displayed on the user interface 104 in operation 308 may include a selectable option adjacent to the display of the content data. When the user wants to further review or claim one or more of the content objects associated with the content data displayed on the user interface 104, the user may select the corresponding selectable option on the user interface 104.

Upon selection one or more content objects associated with the content data displayed on the user interface 104, the user may also select one of the claiming options displayed on the user interface 104. The claiming options include options regarding what the user would like to do in relation to the selected content objects. For example, the claiming options include an option to (1) claim the content object as needed; (2) claim the content object as not needed; and (3) un-claim the content object. Other options are also possible. The claiming options are further described in detail in relation to the user interface engine 204 above.

Although operations 304-308 describe the display of one or more filter options on the user interface that are used to filter the available content objects into a subset before executing operation 310 to select one or more of the content objects within the subset of content objects, in some examples, operations 304-308 may be skipped completely and the user may execute operation 310 of selecting one or more content objects after completion of operation 302, which includes displaying a list of content data associated with all available content objects within the content claiming application on the user interface 104. In other words, the user may be able to select one or more content objects from the list of available content objects directly instead of first filtering the content objects based one or more filter options first.

In operation 312, the claims micro-services engine 206 interfaces with the user interface engine 204 to display a request to confirm that the user intends to claim ownership over the content object. Depending on the claiming option selected by the user in operation 310 and received by the claims micro-services engine 206, the confirmation request may have different options.

For example, upon receiving a selection of the claiming option to "claim the content object as needed", the claims micro-services engine 206 may interface with the user interface engine 204 to cause the user interface 104 to display an attestation display requesting the user to confirm the claiming of the content object. As part of the confirmation process, the claims micro-services engine 206 may interface with the user interface engine 204 to request that the user claim the content object by providing user's application identifier or support group identifier. Receiving a submission of the application identifier or support group identifier from the user serves as an attestation that the user or team of users claims ownership over the content object and a confirmation that the content object is in use or will be in use and therefore in need of continued storage and maintenance.

For example, upon receiving a selection of the option to "c", the claims micro-services engine 206 may interface with the user interface engine 204 to cause the user interface 104 to display an attestation display requesting the user to confirm the claiming of the content object and to confirm that content object is no longer in use or needed. As part of the confirmation process the claims micro-services engine 206 may interface with the user interface engine 204 to request that the user claim the content object and confirm there is no need for the content object by providing user's application identifier or support group identifier. Receiving a submission of the application identifier or support group identifier from the user serves as an attestation that the user or team of users claims ownership over the content object and a confirmation that the content object is not in use or will not be in use and therefore does not need to be stored and/or maintained.

For example, upon receiving a selection of the option to "un-claim the content object", the claims micro-services engine 206 may interface with the user interface engine 204 to cause the user interface 104 to display an attestation display requesting the user to confirm the un-claiming of the content object. The user may have previously purposely or accidentally claimed the content object. However, circumstances may have since changed and the user or the group/team that the user is associated with may no longer own the content object. Receiving a selection confirming that user wants to un-claim ownership over the content object serves as an attestation that the user or team of users un-claim ownership over the content object.

In operation 314, the claims micro-services engine 206 receives the attestations associated with one of the claiming options. In addition to the attestations, the claims micro-services engine 206 may interface with the user interface engine 204 may collect additional data associated with the user input, including the user identifier associated with the user operating the user electronic computing device 102, the date and time at which attestation was submitted, etc. The user interface engine 204 may collect the data associated with the user input and send it to the claims micro-services engine 206.

In operation 316, the claims micro-services engine 206 uses the attestations and the collected data associated user input from operation 314 to update the content data associated with the respective content object in the datastore 114. For example, the received attestation and collected data are associated with a one or more content objects that were selected in operation 310. The claims micro-services engine 206 interfaces with the database engine 208 to retrieve the content data associated with the one or more content objects that were selected in operation 310 and update the content data, including the claim status and the usage status, with the received attestation and collected data. For example, if the claiming option that was selected in operation 310 was to "claim the content object as needed", the claims micro-services engine 206 may update the claim status of the associated claim object to be "claimed" and the usage status of the associated claim object to be "needed".

In operation 318, the claims micro-services engine 206 may interface with the database engine 208 to store the updated content data in the datastore 114. For example, if after the update, the claim status of the content data associated with a content object is set to "un-claimed", the content object and associated content data is stored in the un-claimed content database 116. If after the update, the claim status of the content data associated with a content object is set to "claimed", the content object and associated content data is stored in the claimed content database 118.

In operation 320, the reporting engine 210 interfaces with the database engine 208 to retrieve the content data of one or more content objects from the datastore 114 to generate one or more reports related to the one or more content objects. For example, the user interface 104 may include an option to generate a report where the user may select the option to generate a report and may also select the content objects that should be included within the report. In addition, the user, via the user interface 104, may also be able to provide input regarding what the report should include and how it should be organized. Based on this user input regarding the report, the reporting engine 210 may retrieve the appropriate content data from the datastore 114 and generate the report. Once generated, the reporting engine 210 may interface with the database engine 208 to store the generated report or reports in the datastore 114.

For example, the report may be customizable and may include metrics related to one or more of the following: total number of content objects, the percentage of content objects that are claimed, the percentage of content objects that remain un-claimed, a timeline of when the content objects were created, a breakdown of users or groups that own the claimed content objects, percentage of content objects are attested as being needed, the space needed to store the claimed content objects, breakdown of claimed and/or un-claimed content objects by creator, application type, title, etc. and one or more comparative data comparing the content objects claimed and un-claimed by a user and or group.

In operation 322, the reporting engine 210 may interface with the database engine 208 to retrieve the stored generated report or reports from the datastore 114 to display on the user interface 104 on the user electronic computing device 102. Along with the reports, the reporting engine 210 may interface with the user interface engine 204 to also display one or more insights regarding the content objects. For example, the reporting engine 210 may also calculate the total storage costs for storing all claimed and un-claimed content objects. The reporting engine 210 may provide insights related to savings in space and costs for the organization when all un-claimed content objects are no longer stored or maintained. In another example, the reporting engine 210 may provide insights related to savings in space and costs for the organization when all content objects that belong to the object type "dashboards" are no longer stored or maintained. The insights may help a user to make decisions regarding how to proceed in claiming or un-claiming content objects to benefit the organization.

Figure 4:
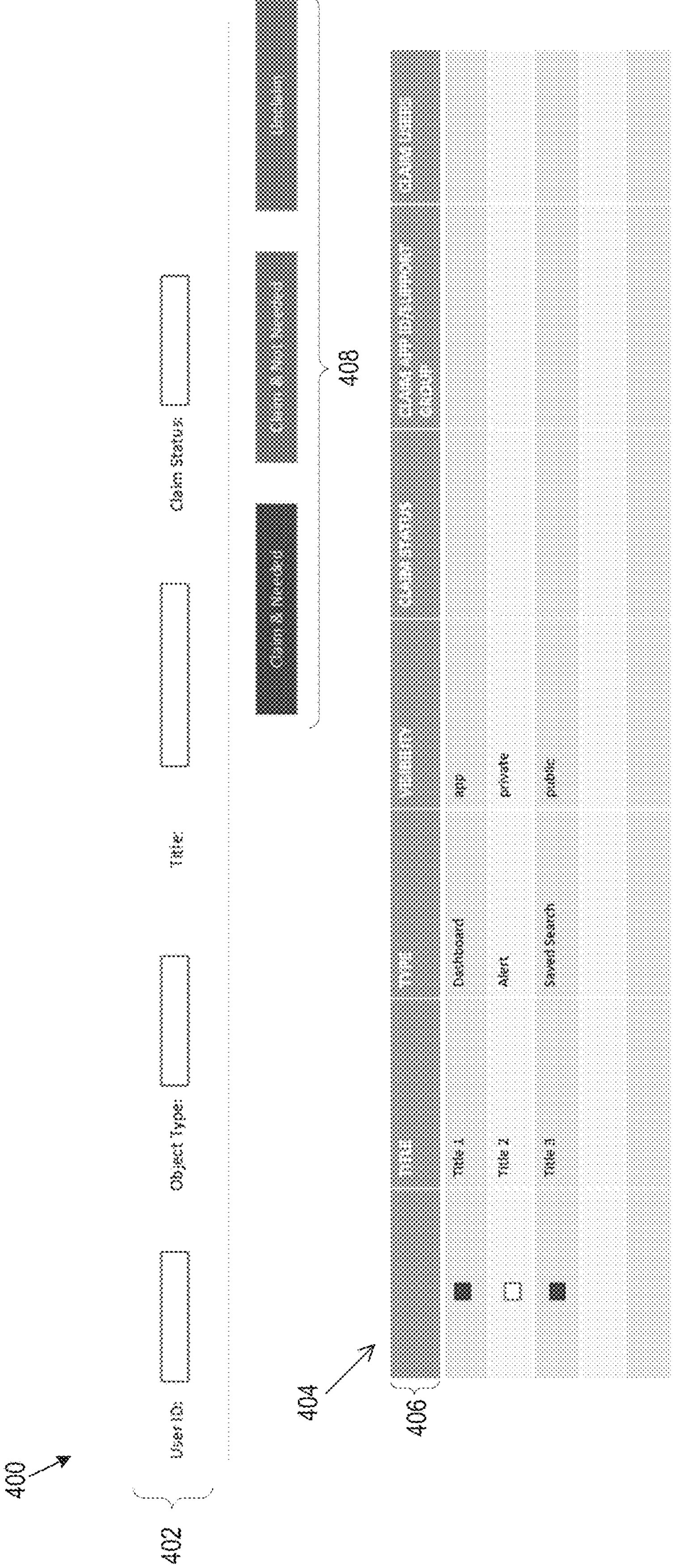
FIG. 4 illustrates an example user interface of the content claiming application of FIG. 2.

FIG. 4 illustrates an example user interface 400 of the content claiming application 110 of FIG. 1. The user interface 400 is displayed on the user electronic computing device 102. The user interface 400 is updated based on data received from the user interface engine 204 of the content claiming application 110.

The user interface 400 illustrates filter criteria inputs 402 that includes a plurality of filter criteria. Each filter criteria within the filter criteria inputs 402 serves to filter the available claim objects such that only claim objects that comply with the selected filter criteria are displayed for further analyzes on the user interface 400. In the user interface 400, the filter criteria inputs 402 include "user ID", "object type", "title", and "claim status". In other examples, the filter criteria inputs 402 may include more or less number of filter criteria. In yet other examples, the filter criteria inputs 402 may include one or more predefined filter criteria.

Upon the user electing to filter using one or more of the filter criteria within the filter criteria inputs 402, the user may enter values within the input boxes to filter the content objects based on the entered value of the filter criteria. In other cases, a selectable drop-down menu of options may be displayed adjacent to each filter criterial such that the user may select one of the options from the drop-down menu to filter the content objects based on the selected option of the filter criteria.

The user interface 400 may also include a content object table 404 that lists one or more content data associated with one or more content objects. In the user interface 400, the content object table 404 lists content data associated with content objects that have already been filtered. In other examples, the content object table 404 lists content data associated with all available content objects.

The content object table 404 is a table with a plurality of columns and rows. The content object table 404 may include parameter listings 406 that include the parameters by which the content data displayed within the content object table 404 are organized by. In other words, each column of the content object table 404 lists content data associated with particular parameter listings 406. Each row of the content object table 404 lists the content data values associated with a particular content object.

For example, the content data within the content object table 404 are organized based on the parameter listings 406: content object selector, title, type, visibility, claim status, claim app identifier/support group identifier and claim users. Each row of the content object table 404 corresponding to the content object selector parameter listing column includes a selectable option that can be selected to indicate that a claiming option may be applied to the corresponding content object.

Each row of the content object table 404 corresponding to the title parameter listing column includes the title of the respective content object. Each row of the content object table 404 corresponding to the type parameter listing column includes the type of the respective content object. For example, types of content objects include: dashboards, alerts, saved searches, etc. Each row of the content object table 404 corresponding to the visibility parameter listing column includes the visibility associated with the respective content object. For example, the visibility of a content object may indicate who can view the content object; whether the content object is private and viewable by only uses with access, whether the content object is public and is viewable by all users or whether the content object is only viewable within a certain application, etc.

Each row of the content object table 404 corresponding to the claim status parameter listing column includes the claim status of the respective content object. For example, claim status may indicate whether the content object has been claimed and/or whether the content object is in use or needed. Each row of the content object table 404 corresponding to the claim app id/support group parameter listing column includes the application identifier or support group identifier of the respective content object. For example, when a content object includes a claim status of claimed and/or needed, the claim app id/support group may list the particular application identifier of support group identifier associated with the user or group/team of users that take ownership of the content object. Each row of the content object table 404 corresponding to the claim users parameter listing column includes the user identifier associated with the user that claimed or attested ownership over the respective content object.

In the content object table 404, the claim status, claim app id/support group and claim users are not filled out for the claim objects with titles "Title 1", "Title 2" and "Title 3" because the claim objects are unclaimed. The user may select one or more of the content objects by selecting one or more of the content object selectors corresponding to the one or more content objects to claim the content objects. In the user interface 400, the content objects corresponding to titles "Title 1" and "Title 3" have been selected. Once the user has selected the content objects to claim, the user may select one of the claiming options 408. Upon the user completing the claiming process, parameter listings 406 of claim status, claim app id/support group and claim users of the content object table 404 may be updated as described further in relation to FIG. 7.

The claiming options 408 include a plurality of options regarding claiming ownership and confirming usage of a content objects. For example, the user may select one of the claiming options 408 to apply to all selected content object that were selected using the content object selector.

In the user interface 400, the claiming options 408 includes a first option: "claim & needed", a second option: "claim & not needed" and a third option "unclaim". The first option of "claim & needed" allows the user to claim ownership over the selected content objects and claim that the selected content object is needed and still in use by at least by some users within the organization. The second option of "claim & not needed" allows a user to claim ownership over the selected content object while confirming that the selected claim object is no longer in user or in need. The third option of "unclaim" allows a user to un-claim a previously claimed content object.

Selecting one of the claiming options 408 causes the user interface 400 to display additional selectable options, as described below in relation to FIGS. 5 and 6.

Figure 5:
FIG. 5 illustrates another example user interface of the content claiming application of FIG. 2.

FIG. 5 illustrates another example user interface 500 of the content claiming application 110 of FIG. 1. The user interface 500 includes an attestation display 502 that is generated and displayed upon the user selecting the first option "claim & needed" of the claiming options 408 on user interface 400. In some examples, the attestation display 502 is a pop-up display that is overlaid on top of the user interface 400.

The attestation display 502 is configured to receive attestation information for the user. For example, the attestation display 502 includes a first attestation option 504 and a second attestation option 506. The user may select the first attestation option 504 if the user wants to attest to ownership and usage as an individual. In such a case, the user may claim ownership of the content object against an application identifier associated with the user. Alternatively, the user may select the second attestation option 506 if the user wants to attest to ownership and usage as part of a team or group. In such a case, the user may claim ownership of the content object against a support group identifier associated with the group or team.

In the user interface 500, the user has selected to attest to ownership as an individual by selecting the first attestation option 504. The subsequent update to the attestation display is described in detail in relation to FIG. 6.

Figure 6:
FIG. 6 illustrates an updated user interface from FIG. 5.
Figure 6:
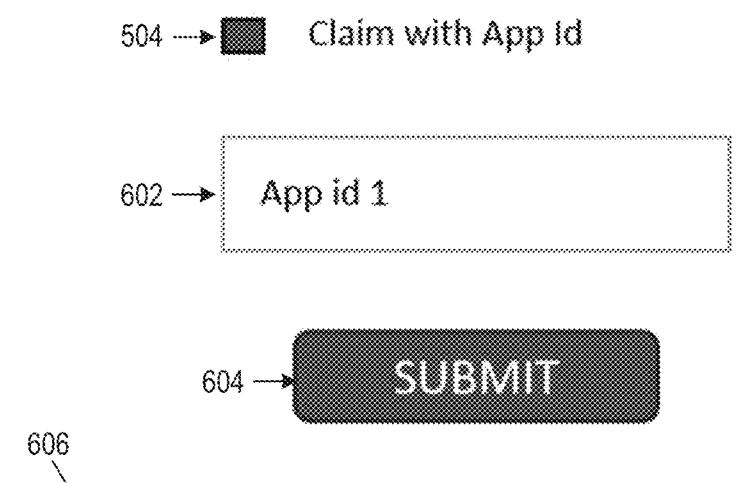

FIG. 6 illustrates an updated attestation display 600 that is an updated version of the attestation display 502 from FIG. 5. In some examples, the updated attestation display 600 is also a pop-up display. The updated attestation display 600 is displayed after the user selects the first attestation option 504 within the attestation display 502 of FIG. 5. The updated attestation display 600 includes an identifier input 602 where the user may enter the application identifier associated with the user as the application owner. Entering the application identifier within the identifier input 602 and selecting a submit option 604 is considered an attestation by the user that the user, as an application owner, takes ownership of the selected content objects from FIG. 4 and confirms the need for the selected content objects to continue to be stored and maintained. Upon selecting the submit option 604, the attestation from the user is sent to the claims micro-services engine 206 for further processing and storage and a confirmation message 606 is displayed on the updated attestation display 600 that confirms that the user has successfully claimed the content object under the submitted application identifier.

Although not illustrated herein, in examples where the user selected the second attestation option 506 on the attestation display 502 of FIG. 5, a similar updated attestation display with an identifier input where the user may enter the support group identifier may be possible.

Figure 7:
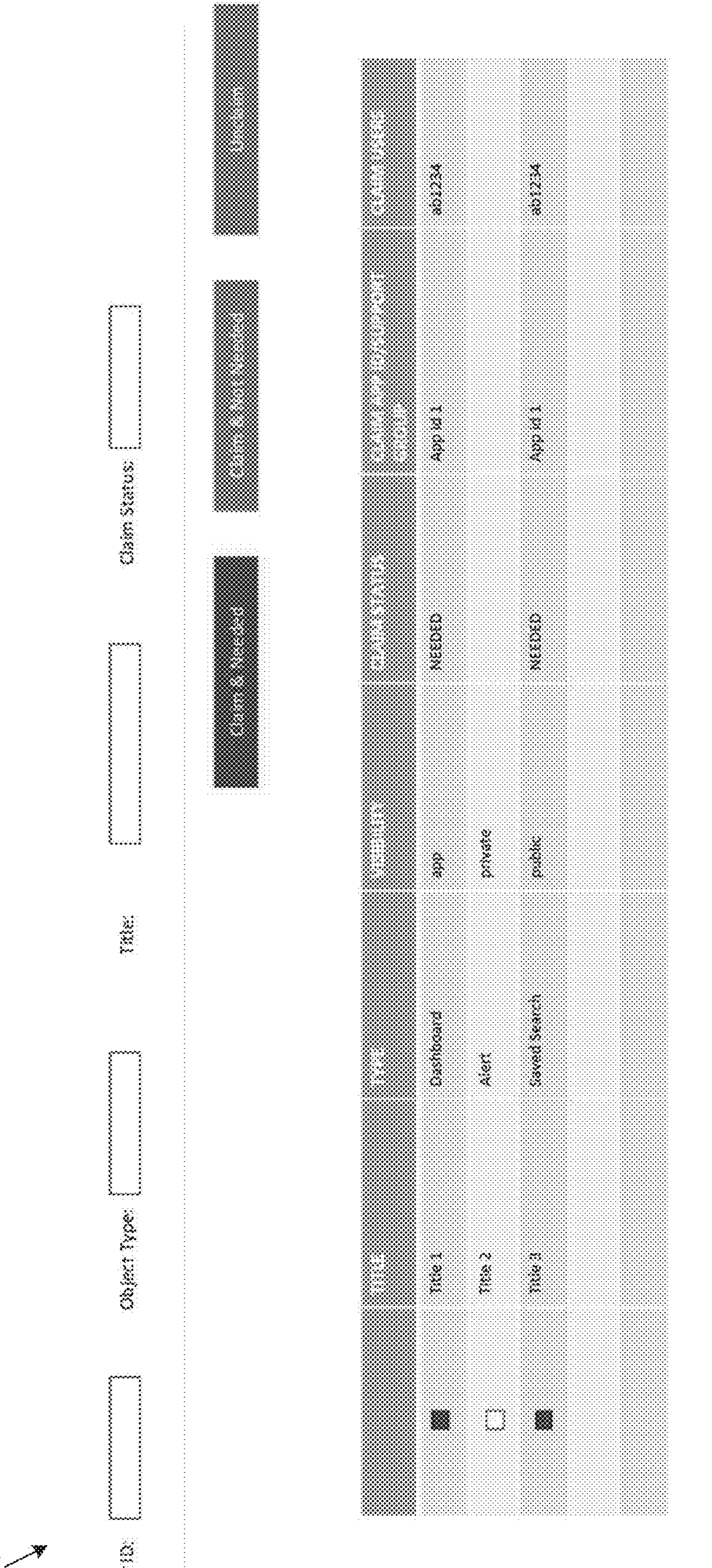
FIG. 7 illustrates another example user interface of the content claiming application of FIG. 2.

FIG. 7 illustrates another example user interface 700 of the content claiming application 110 of FIG. 1. The user interface 700 is an updated version of the user interface 400 from FIG. 4. In the user interface 700, the rows of claim data associated with the selected claim objects with titles of "Title 1" and "Title 3" from content object table 404 from FIG. 4 are updated to include claim status, claim app id/support group and claim users data based on the information provided by the user during the attestation process via the attestation display 502 and updated attestation display 600 described in the FIGS. 5 and 6. For example, for the content objects with the titles "Title 1" and "Title 3", the claim status is updated to "Needed", the claim app id/support group is updated to "App id 1" and claim users is updated to "ab1234".

Figure 8:
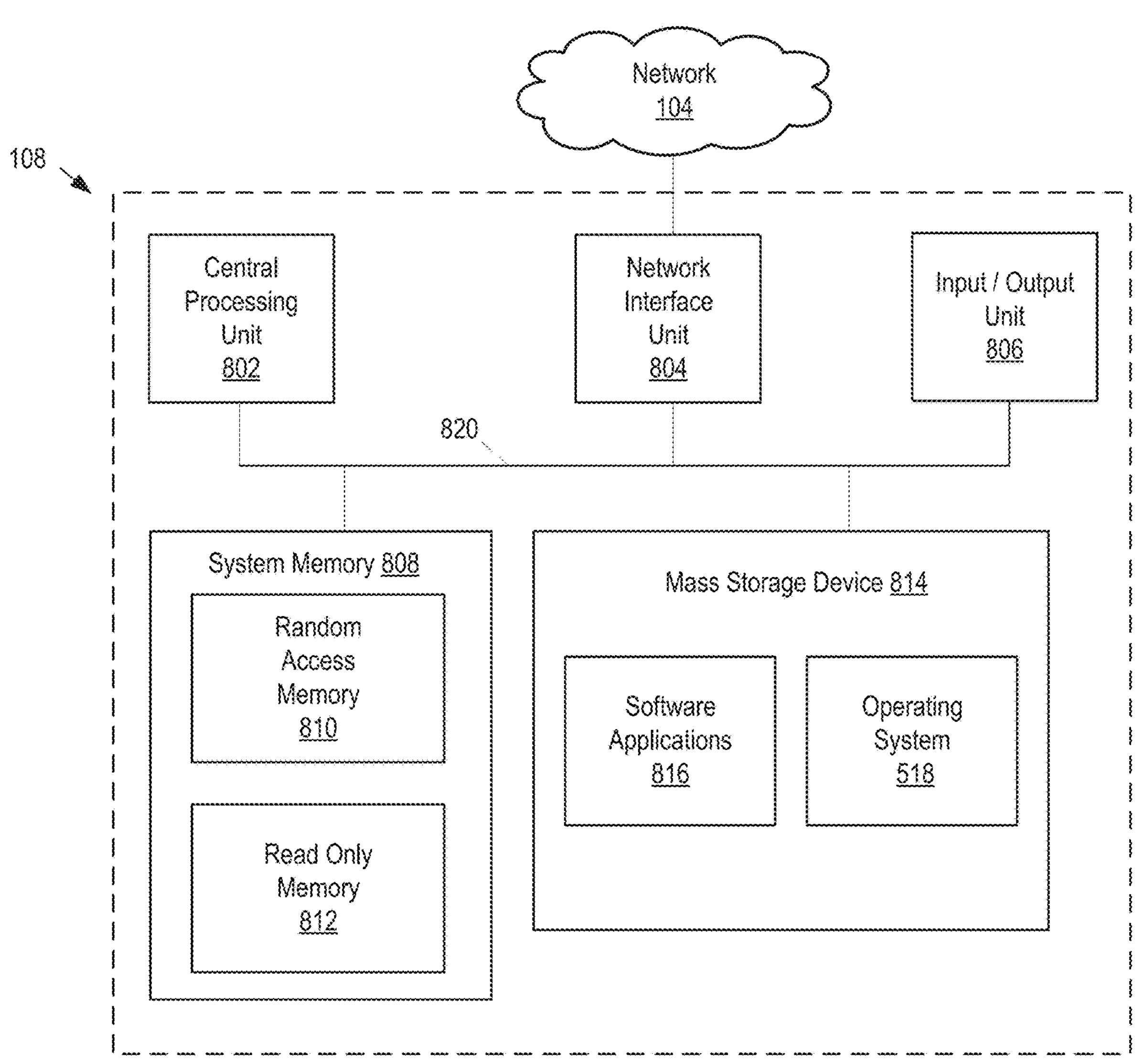
FIG. 8 illustrates example physical components of the computing devices of FIG. 1.

FIG. 8 illustrates example physical components of the computing devices of FIG. 1. As illustrated in the example of FIG. 8, the server computing device 108 includes at least one central processing unit ("CPU") 802, a system memory 808, and a system bus 820 that couples the system memory 808 to the CPU 802. The system memory 808 includes a random-access memory ("RAM") 810 and a read-only memory ("ROM") 812. A basic input/output system that contains the basic routines that help to transfer information between elements within the server computing device 108, such as during startup, is stored in the ROM 812. The server computing device 108 further includes a mass storage device 814. The mass storage device 814 is able to store software instructions and data associated with software applications 816. Some or all of the components of the server computing device 108 can also be included in user electronic computing device 102.

The mass storage device 814 is connected to the CPU 802 through a mass storage controller (not shown) connected to the system bus 820. The mass storage device 814 and its associated computer-readable data storage media provide non-volatile, non-transitory storage for the server computing device 108. Although the description of computer-readable data storage media contained herein refers to a mass storage device, such as a hard disk or solid-state disk, it should be appreciated by those skilled in the art that computer-readable data storage media can be any available non-transitory, physical device or article of manufacture from which the central processing unit can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computing device 108.

According to various embodiments of the invention, the server computing device 108 may operate in a networked environment using logical connections to remote network devices through the network 106, such as a wireless network, the Internet, or another type of network. The server computing device 108 may connect to the network 106 through a network interface unit 804 connected to the system bus 820. It should be appreciated that the network interface unit 804 may also be utilized to connect to other types of networks and remote computing systems. The server computing device 108 also includes an input/output controller 806 for receiving and processing input from a number of other devices, including a touch user interface display screen, or another type of input device. Similarly, the input/output controller 806 may provide output to a touch user interface display screen or other type of output device.

As mentioned briefly above, the mass storage device 814 and the RAM 810 of the server computing device 108 can store software instructions and data associated with software applications 816. The software instructions include an operating system 818 suitable for controlling the operation of the server computing device 108. The mass storage device 814 and/or the RAM 810 also store software instructions, that when executed by the CPU 802, cause the server computing device 108 to provide the functionality of the server computing device 108 discussed in this document. For example, the mass storage device 814 and/or the RAM 810 can store software instructions that, when executed by the CPU 802, cause the server computing device 108 to display received data on the display screen of the server computing device 108.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method for content claiming, the method comprising: displaying one or more unclaimed content objects on a user interface of a user electronic computing device associated with a user;

receiving a selection of at least one unclaimed content object of the one or more unclaimed content objects;

receiving a first selection of a selected claiming option from a plurality of claiming options, wherein the plurality of claiming options is related to claiming ownership of the at least one unclaimed content object;

based on the selected claiming option, displaying a request for attestation on the user interface;

receiving the attestation from the user interface;

updating content data associated with the at least one unclaimed content object based on the attestation to generate an updated content data associated with the at least one unclaimed content object; and storing the updated content data associated with the at least one unclaimed content object in a datastore, wherein the plurality of claiming options includes at least one option associated with need.

2. The method of claim 1, further comprising: retrieving a plurality of content objects from a content source computing device; analyzing content data associated with the plurality of content objects to identify claimed content objects and un-claimed content objects within the plurality of content objects; and storing the claimed content objects in a first database and the un-claimed content objects in a second database within the datastore.

3. The method of claim 2, further comprising: generating a report regarding at least one or more of the plurality of content objects, the report including metrics related to one or more of: a percentage of content objects within the at least one or more of the plurality of content objects that are claimed, a percentage of content objects within the at least one or more of the plurality of content objects that are un-claimed, a timeline of when the at least one or more of the plurality of content objects were created, a percentage of the at least one or more of the plurality of content objects that have been attested as being needed, and computing resources needed to store the at least one or more of the plurality of content objects.

4. The method of claim 2, further comprising: displaying one or more filter criteria on the user interface; receiving a second selection of at least one of the one or more filter criteria; and filtering the claimed content objects and the un-claimed content objects based on the at least one of the one or more filter criteria to generate the one or more unclaimed content objects.

5. The method of claim 1, wherein the content data associated with the at least one unclaimed content object includes one or more of: title of the at least one unclaimed content object, a type of the at least one unclaimed content object, a visibility level associated with the at least one unclaimed content object, a claim status of the at least one unclaimed content object, a usage status of the at least one unclaimed content object, a claim identifier associated with the at least one unclaimed content object and a user identifier associated with the at least one unclaimed content object.

6. The method of claim 1, wherein the plurality of claiming options includes: a first option to claim ownership and need, a second option to claim ownership and no need, and a third option to un-claim ownership.

7. The method of claim 6, wherein when the selected claiming option is the first option or the second option, receiving the attestation includes receiving an application identifier or a support group identifier associated with the user to indicate that the user confirms claim of ownership over the at least one unclaimed content object.

8. The method of claim 7, wherein when the selected claiming option is the first option, updating the content data associated with the at least one unclaimed content object includes updating the claim status of the at least one unclaimed content object to indicate that the at least one unclaimed content object has been claimed and updating a usage status of the at least one unclaimed content object to indicate that the at least one unclaimed content object is needed.

9. The method of claim 8, wherein the at least one unclaimed content object is transferred to a cloud storage.

10. The method of claim 7, wherein when the selected claiming option is the second option, updating the content data associated with the at least one unclaimed content object includes updating the claim status of the at least one unclaimed content object to indicate that the at least one unclaimed content object has been claimed and updating a usage status of the at least one unclaimed content object to indicate that the at least one unclaimed content object is not needed.

11. The method of claim 10, wherein the at least one unclaimed content object is deleted from the datastore.

12. A system for content claiming, the system comprising: a processor; memory comprising instructions that when executed by the processor causes the processor to: display one or more unclaimed content objects on a user interface of a user electronic computing device associated with a user; receive a selection of at least one unclaimed content object of the one or more unclaimed content objects; receive a first selection of a selected claiming option from a plurality of claiming options, wherein the plurality of claiming options is related to claiming ownership of the at least one unclaimed content object; based on the selected claiming option, display a request for attestation on the user interface; receive the attestation from the user interface; update content data associated with the at least one unclaimed content object based on the attestation to generate an updated content data associated with the at least one unclaimed content object; and store the updated content data associated with the at least one unclaimed content object in a datastore, wherein the plurality of claiming options includes at least one option associated with need.

13. The system of claim 12, wherein the instructions, when executed by the processor, further cause the processor to: retrieve a plurality of content objects from a content source computing device; analyze content data associated with the plurality of content objects to identify claimed content objects and un-claimed content objects within the plurality of content objects; and store the claimed content objects in a first database and the un-claimed content objects in a second database within the datastore.

14. The system of claim 13, wherein the instructions, when executed by the processor, further cause the processor to: generate a report regarding at least one or more of the plurality of content objects, the report including metrics related to one or more of: a percentage of content objects within the at least one or more of the plurality of content objects that are claimed, a percentage of content objects within the at least one or more of the plurality of content objects that are un-claimed, a timeline of when the at least one or more of the plurality of content objects were created, a percentage of the at least one or more of the plurality of content objects that have been attested as being needed, and computing resources needed to store the at least one or more of the plurality of content objects.

15. The system of claim 13, wherein the instructions, when executed by the processor, further cause the processor to: display one or more filter criteria on the user interface; receive a second selection of at least one of the one or more filter criteria; and filter the claimed content objects and the un-claimed content objects based on the at least one of the one or more filter criteria to generate the one or more unclaimed content objects.

16. The system of claim 12, wherein the content data associated with the at least one unclaimed content object includes one or more of: title of the at least one unclaimed content object, a type of the at least one unclaimed content object, a visibility level associated with the at least one unclaimed content object, a claim status of the at least one unclaimed content object, a usage status of the at least one unclaimed content object, a claim identifier associated with the at least one unclaimed content object and a user identifier associated with the at least one unclaimed content object.

17. The system of claim 12, wherein the plurality of claiming options includes: a first option to claim ownership and need, a second option to claim ownership and no need, and a third option to un-claim ownership.

18. The system of claim 17, wherein when the selected claiming option is the first option or the second option, receiving the attestation includes receiving an application identifier or a support group identifier associated with the user to indicate that the user confirms claim of ownership over the at least one unclaimed content object.

19. The system of claim 18, wherein when the selected claiming option is the first option, updating the content data associated with the at least one unclaimed content object includes updating the claim status of the at least one unclaimed content object to indicate that the at least one unclaimed content object has been claimed and updating a usage status of the at least one unclaimed content object to indicate that the at least one unclaimed content object is needed.

20. A method for content claiming using a content claiming application, the method comprising: retrieving a plurality of content objects from a content source computing device; displaying a user interface associated with the content claiming application on a user electronic computing device, wherein the user interface includes: a listing of the plurality of content objects; receiving a first selection of at least one content object of the plurality of content objects; receiving a second selection to claim ownership over the at least one content object; displaying a request for attestation regarding ownership of the at least one content object; receiving attestation of ownership over the at least one content object; updating a claim status associated with the at least one content object to indicate that the at least one content object is claimed; and transferring storage of the at least one content object to a cloud storage device, wherein a plurality of claiming options includes at least one option associated with need.

* * * * *